United States Patent
Yu et al.

(10) Patent No.: US 11,584,248 B2
(45) Date of Patent: Feb. 21, 2023

(54) METHOD OF PARKING AN AUTONOMOUS DRIVING VEHICLE FOR AUTONOMOUS CHARGING

(71) Applicants: Baidu USA LLC, Sunnyvale, CA (US); Baidu.com Times Technology (Beijing) Co., Ltd., Beijing (CN)

(72) Inventors: Ning Yu, Beijing (CN); Fan Zhu, Sunnyvale, CA (US); Jingjing Xue, Beijing (CN)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 296 days.

(21) Appl. No.: 16/753,204

(22) PCT Filed: Mar. 20, 2020

(86) PCT No.: PCT/CN2020/080498
§ 371 (c)(1),
(2) Date: Apr. 2, 2020

(87) PCT Pub. No.: WO2021/184378
PCT Pub. Date: Sep. 23, 2021

(65) Prior Publication Data
US 2021/0291679 A1 Sep. 23, 2021

(51) Int. Cl.
*B60L 53/36* (2019.01)
*G05D 1/02* (2020.01)

(52) U.S. Cl.
CPC ............ *B60L 53/36* (2019.02); *G05D 1/0225* (2013.01)

(58) Field of Classification Search
CPC ...................................... B60L 53/36
See application file for complete search history.

(56) References Cited

U.S. PATENT DOCUMENTS

| | | | | |
|---|---|---|---|---|
| 10,054,940 | B2* | 8/2018 | Solyom | B62D 15/025 |
| 10,710,633 | B2* | 7/2020 | Carlson | B62D 15/0285 |
| 11,027,650 | B2* | 6/2021 | Peng | B60L 58/12 |
| 11,148,668 | B2* | 10/2021 | Green | B60W 30/06 |
| 2021/0291679 | A1* | 9/2021 | Yu | B60L 53/36 |

* cited by examiner

*Primary Examiner* — Michael A Berns
(74) *Attorney, Agent, or Firm* — Womble Bond Dickinson (US) LLP (57) ABSTRACT

In one embodiment, an exemplary method of autonomously charging an autonomous driving vehicle includes receiving, from a sensor in an autonomous driving vehicle (ADV), indication that a batter level of the ADV falls below a threshold; and selecting a charging pile from a plurality of charging piles on a high definition map based on information received from a cloud server. The method further includes generating a first trajectory based on a current location of the ADV and a location of the selected charging pile, the first trajectory connecting a first point representing the current location of the ADV to a second point at the selected charging pile, and including a first segment and a second segment. The method further includes driving forward along the first segment of the first trajectory, and driving backward along the second segment of the first trajectory when the ADV drives towards the selected charging pile along the first trajectory.

18 Claims, 10 Drawing Sheets

FIG. 9 a # METHOD OF PARKING AN AUTONOMOUS DRIVING VEHICLE FOR AUTONOMOUS CHARGING

CROSS-REFERENCE TO RELATED APPLICATION

This patent application is a U.S. National Phase Application under 35 U.S.C. § 371 of International Application No. PCT/CN2020/080498, filed Mar. 20, 2020, entitled "A METHOD OF PARKING AN AUTONOMOUS DRIVING VEHICLE FOR AUTONOMOUS CHARGING," which is incorporated by reference herein by its entirety.

TECHNICAL FIELD

Embodiments of the present disclosure relate generally to operating autonomous vehicles. More particularly, embodiments of the disclosure relate to parking and charging autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

For an autonomous driving vehicles that need charging, e.g., a gasoline-electric hybrid vehicle or purely electric vehicle, a useful feature to have is for the autonomous driving vehicles to locate a charging pile, drive to the charging pile, park at a designated location with sufficient precision, and automatically charge itself using the charging pile. Such a feature is missing in a typical autonomous driving vehicle.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

As described above, automatically charging an electric autonomous driving vehicle requires precise parking and charging itself without human invention. According to various embodiments, systems and methods for autonomously charging autonomous driving vehicles are provided in the disclosure to ease the burden of human drivers to charging the vehicles.

In one embodiment, an exemplary method of autonomously charging an autonomous driving vehicle includes receiving, from a sensor in an autonomous driving vehicle (ADV), indication that a battery level of the ADV falls below a threshold; and selecting a charging pile from a plurality of charging piles on a high definition map based on information received from a cloud server. The method further includes generating a first trajectory based on a current location of the ADV and a location of the selected charging pile, the first trajectory connecting a first point representing the current location of the ADV to a second point at the selected charging pile, and including a first segment and a second segment. The method further includes driving forward along the first segment of the first trajectory, and driving backward along the second segment of the first trajectory when the ADV drives towards the selected charging pile along the first trajectory.

In one embodiment, the second point at the charging pile is on an edge of a parking space associated with the selected charging pile. Once the ADV reaches the second point, a second trajectory can be generated to connect the second point to a designated point in the parking space. The ADV can subsequently drive backward along the second trajectory to the designated point for wireless charging.

In one embodiment, the second point can be in the middle of the edge, and the second trajectory can be a straight line so that the ADV can follow the trajectory more easily.

In one embodiment, both the first trajectory and the second trajectory can be stored in memory, such that when the ADV detects that the battery is fully charged or charged to a predetermined level, the ADV can use the pre-stored trajectories to drive out of the open space to an area with visible lane markers.

In one embodiment, both the first trajectory and the second trajectory are generated using a set of software applications that are different from a set of applications used to generate trajectories for the ADV when the ADV is in an area with lane markers. Therefore, the ADV can switch between the two sets of software applications for generating and smoothing trajectories depending on whether the ADV is traveling in an open space or a space with visible lane markers.

In one embodiment, information about each of the charging piles are stored in the cloud server, and the information includes one or more of a location of each charging pile, a functional status of the charging pile, or the availability of the charging pile.

Autonomous Driving Vehicle

Figure 1:
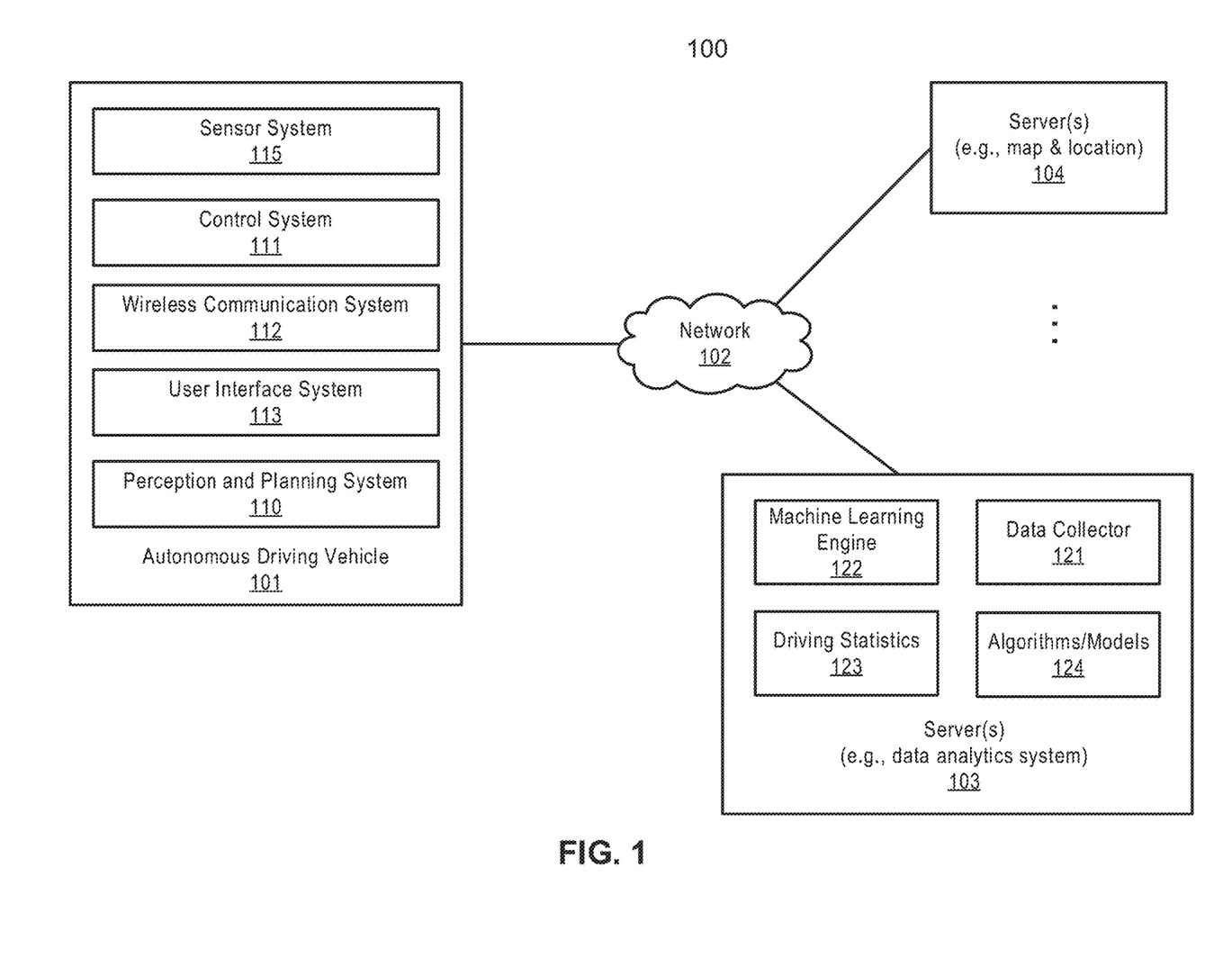
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to operate in an autonomous mode in which the vehicle navigates through an environment with little or no input from a driver. The environment can include an "open space" environment that may not have lane markings or curb markings, and may be difficult to navigate. Examples include performing a U-turn, performing a three-point turn, pulling to the side of the road, or parking a car in a parking lot. Such an open space environment may typically be navigated at slow speed, such as less than 10 miles per hour (mph). There may also be many obstacles, both moving and stationary, which the autonomous vehicle may need to navigate around. Such navigation can include one or more sharp turns, changes from forward to reverse gears, and back, in an attempt to navigate the autonomous vehicle in the open space environment. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
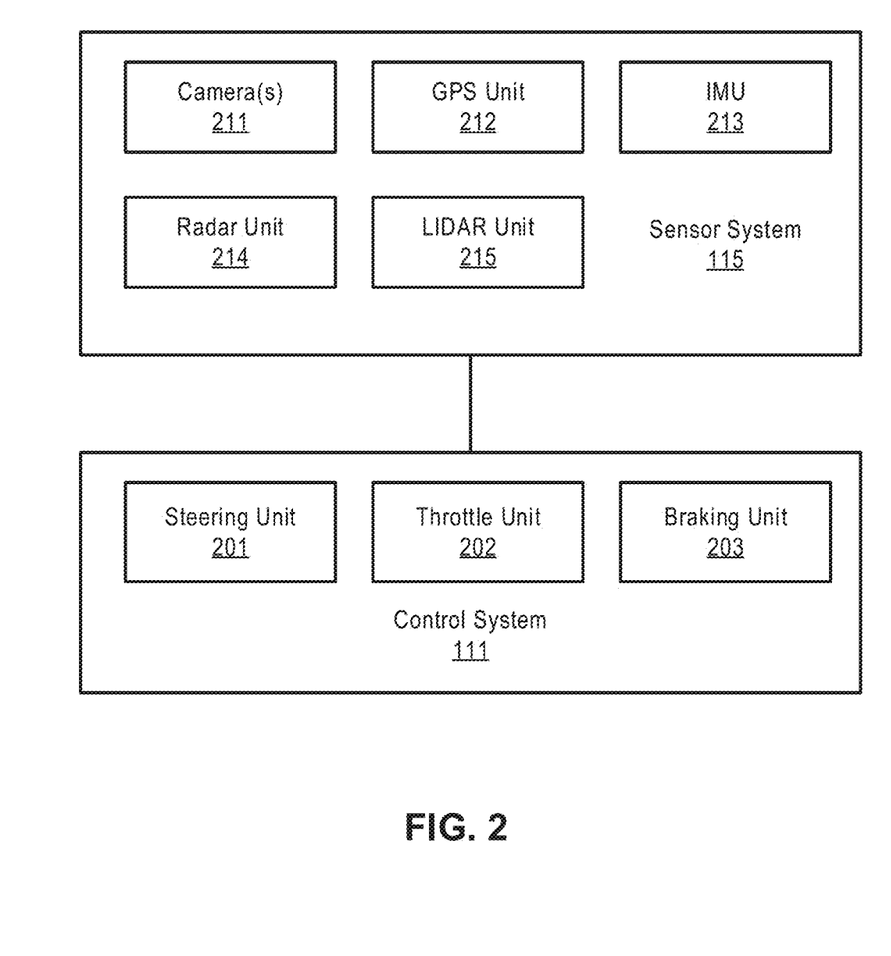
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. In an open space environment, the autonomous vehicle may be commanded by a user to perform a specified function such as: locate a parking space (destination) and navigate to the parking space from the current (starting) location of the autonomous vehicle. Similarly, in an open space environment, the user may command the autonomous vehicle to perform a U-turn, or three-point turn, from the current (starting) location. The user may enter an additional destination that the autonomous vehicle is to treat as the next destination after the U-turn or three-point turn has been performed. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc. Driving statistics may be collected for open space driving scenarios for the purpose of optimizing certain constants within an open space trajectory target function.

Based on driving statistics 123, machine learning engine 122 generates or trains a set of rules, algorithms, and/or predictive models 124 for a variety of purposes. In one embodiment, algorithms/models 124 may include a bicycle model to model the vehicle dynamics for the ADV, an open space optimization model or an RL agent/environment model to plan a trajectory for the ADV in an open space. Algorithms/models 124 can then be uploaded on ADVs (e.g., models 313 of FIG. 3A) to be utilized by the ADVs in real-time.

Figure 3A:
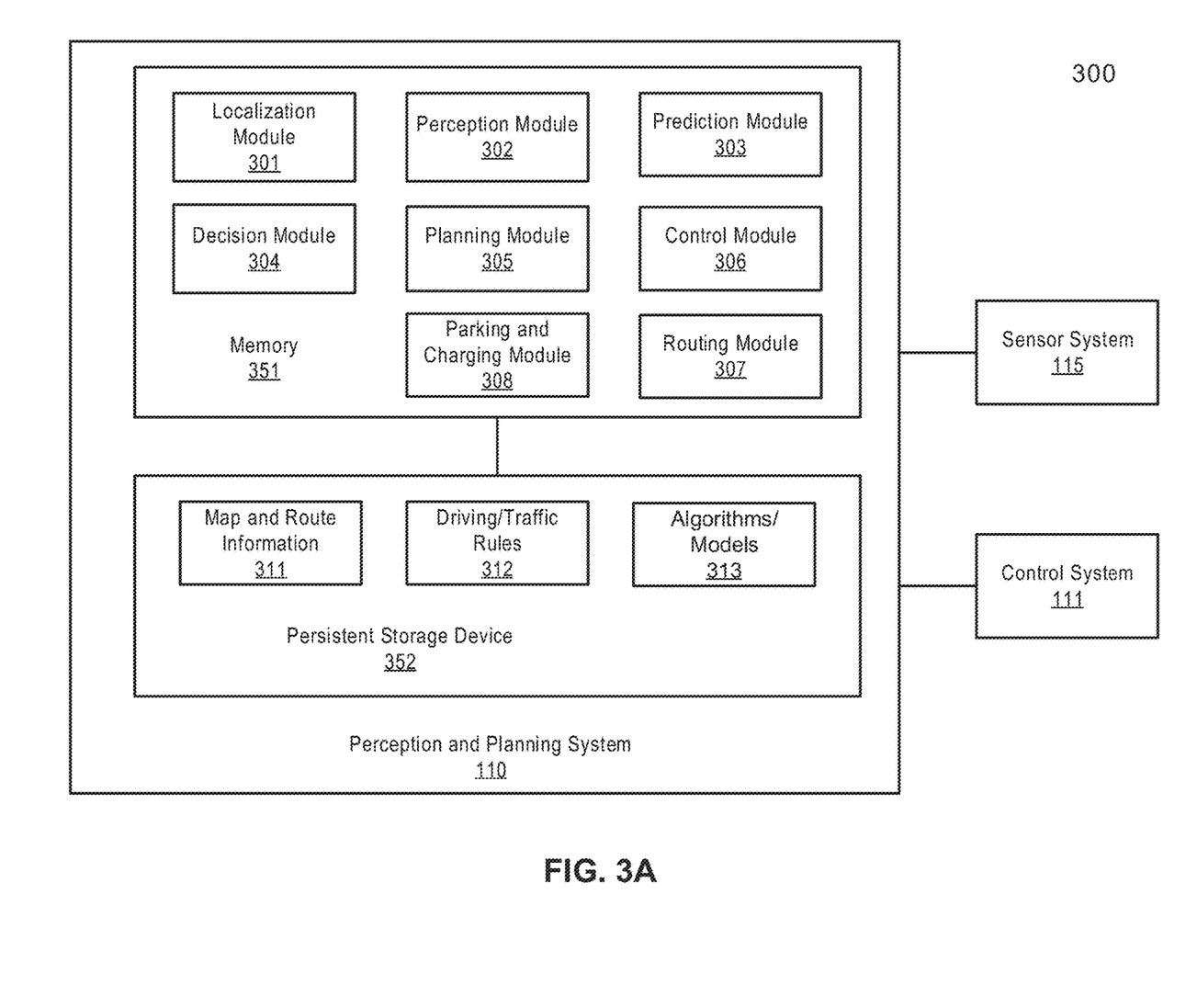
FIGS. 3A-3B are block diagrams illustrating an example of a perception and planning system used with an autonomous vehicle according to one embodiment.
Figure 3B:
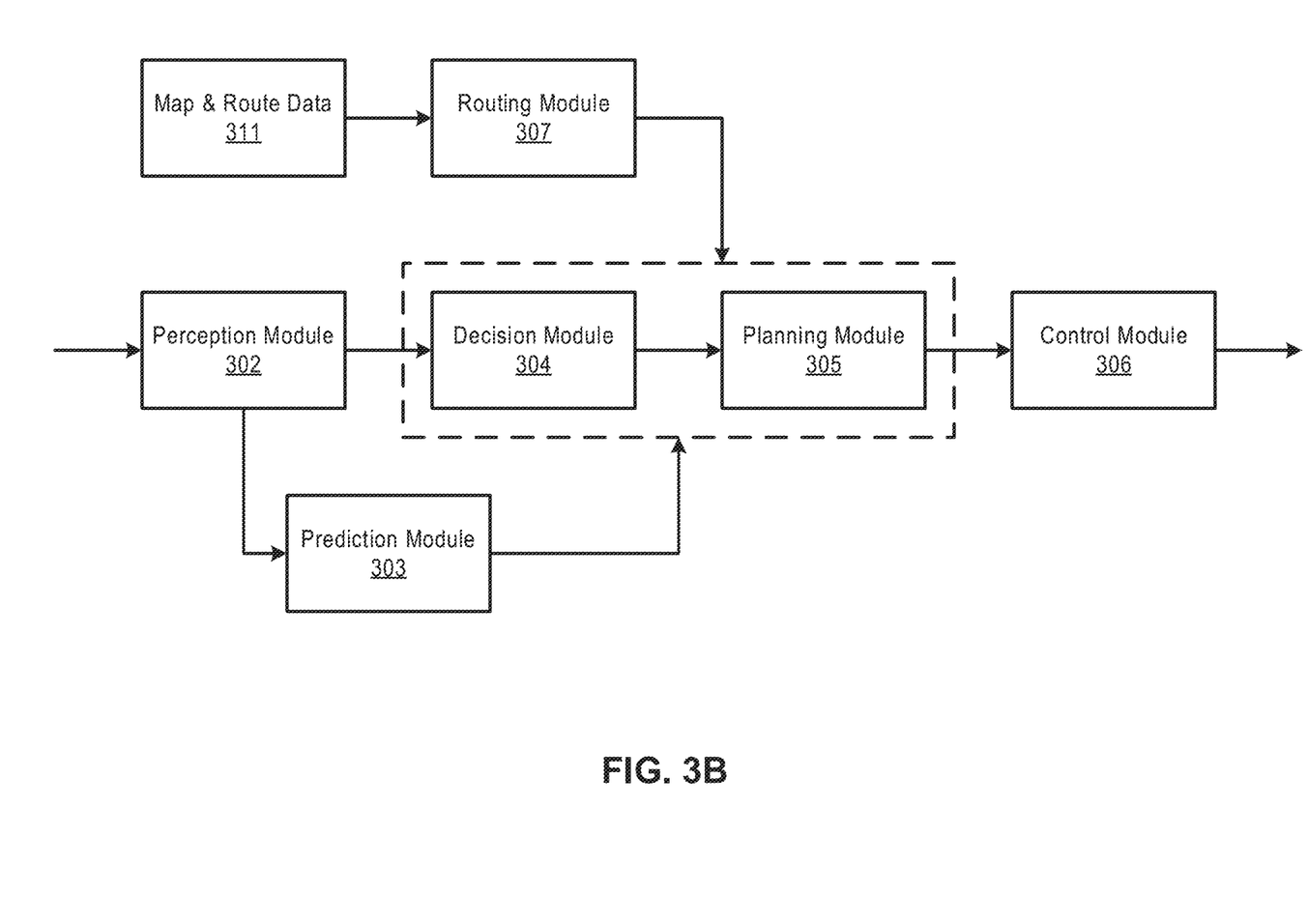

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and parking and charging module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module. For example, planning module 305 and parking and charging module 308 may be an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

The planning process described above is referred to as an on-lane planning process or an ADV is operating in an on-lane mode. The on-lane process refers to trajectory planning based on the lane configuration such as lane markings and lane boundaries, etc., as well as the traffic rules (e.g., traffic lights, yield signs, stop signs, etc.) The ADV is typically driven within the lane boundaries or to follow a lane.

The parking and charging module 308 can implement a method of autonomously charging an autonomous driving vehicle, including searching and locating a charging pile, and then driving and parking the vehicle in an appropriate position for battery charging. The parking and charging module 308 can retrieve information from a cloud server in response to an alert message that the ADV needs to be charged, identify a charging pile based on the information, and uses a two-stage parking approach to park the ADV at the designed point at the charging pile.

Parking and Wireless Charging

Figure 4:
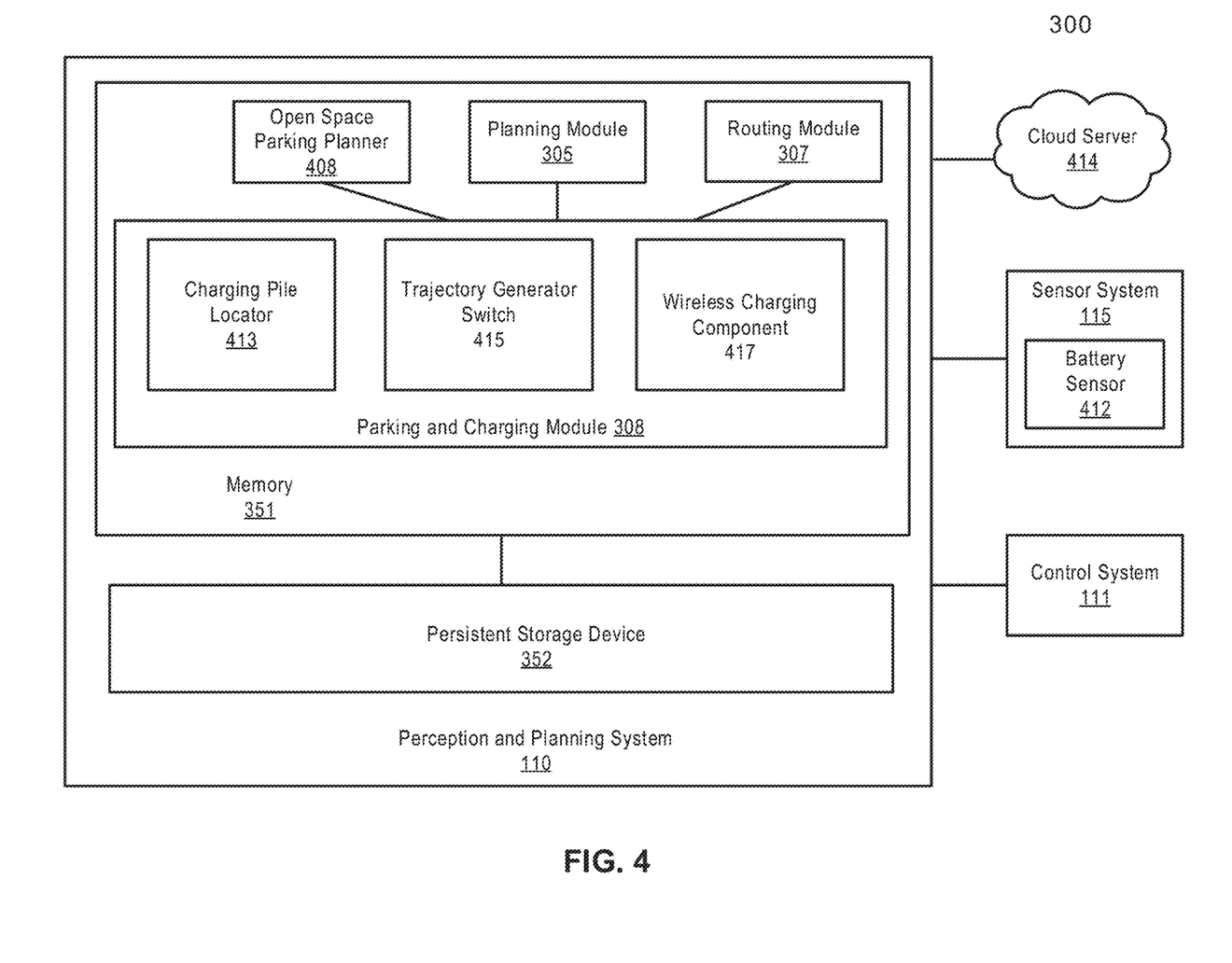
FIG. 4 is a block diagram illustrating an example of a system for parking an ADV for automatic charging according to an embodiment.
Figure 5:
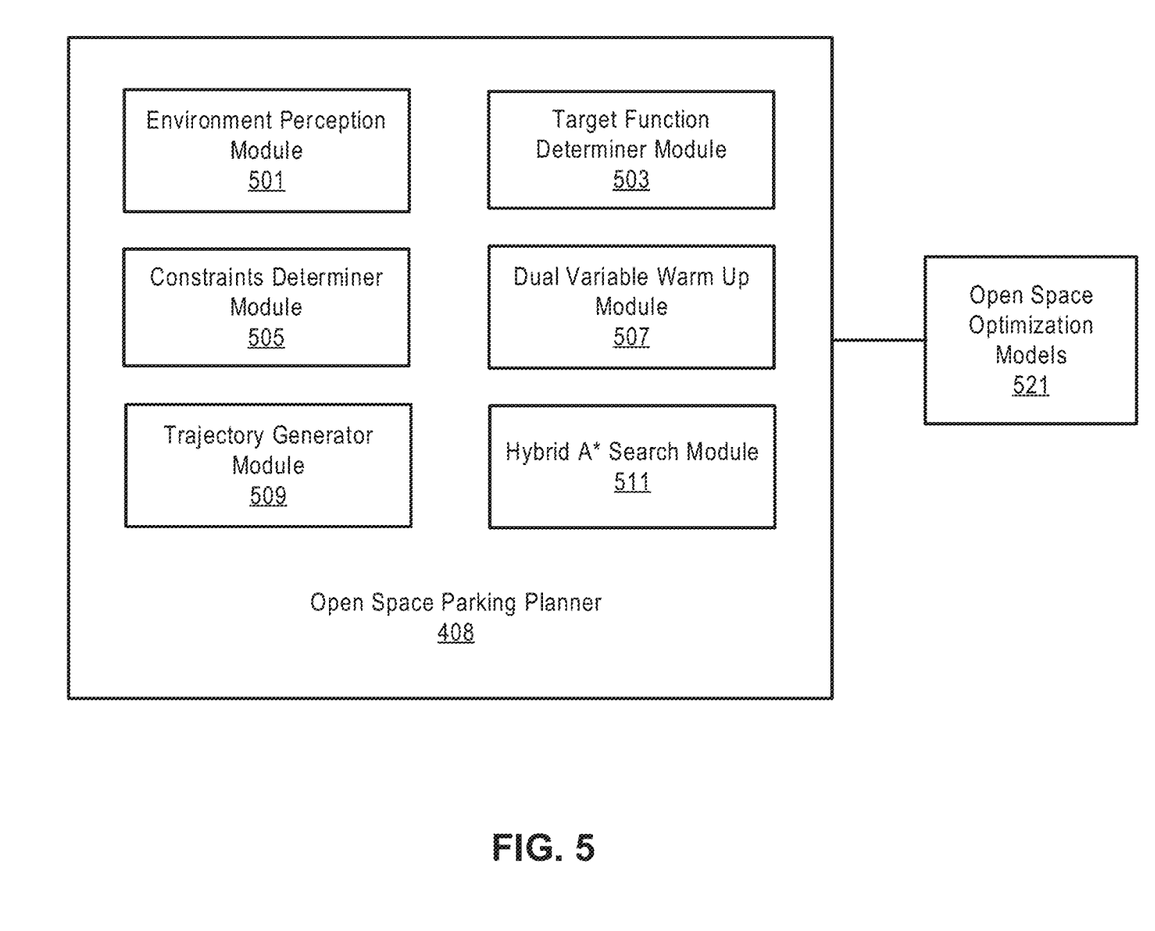
FIG. 5 is a block diagram illustrating an example of an open space parking planner according to one embodiment.

FIG. 4 is a block diagram illustrating an example of a system for parking an ADV for automatic charging according to an embodiment. As shown in FIG. 4, the parking and charging module 308 can interact with the open space parking planner 408 (also simply referred to as an open space planner), the planning module 305, and the routing module 307. The open space planner 408 may be implemented as a part of planning module 305. Planning module 305 may include an on-lane planner and an open-space planner. Planning module 305 may switch to on-lane planning when driving with lane boundaries and switch to open-space planning when driving in an open space. An open space refers to a driving area that is without lane configuration, lane markings, or lane boundaries.

While the planning module 305 and the routing module 307 may be used to generate and smooth trajectories in areas with traffic lanes (e.g., highways), the open space parking planner 408 can include a different set of software components/applications, for use in generating trajectories for the ADV in an open space, where there is no reference lines or traffic lanes to be followed. Additional details of the open space parking planner 408 are described in FIG. 5.

In one embodiment, the parking and charging module 308 can include a charging pile locator 413, a trajectory generator switch 415, and a wireless charging component 417. The charging pile locator 413 can receive, from a battery sensor 412, information about the level of remaining battery in a battery mounted on the chassis or another place on the ADV. If the sensor information indicates the remaining battery is below a threshold (e.g., 20% of battery), the ADV can contact a cloud server 414 to retrieve information about charging piles at a closest charging station.

In one embodiment, the cloud server 414 can store information for all charging stations in a particular area, including identifying information for each charging pile at each charging station, whether the charging pile functions properly, and whether the charging pile is being used for charging an electric vehicle or is idle.

Based on the retrieved information, the charging pile locator 414 can select a charging pile from the closest charging station for charging the ADV. The charging pile locator 414 may consider a number of factors, including the availability of each charging pile at the charging station, the functional status of the charging pie, the distance between the ADV and the charging pile, and the number of static obstacles that the ADV has to get around to reach the charging pile.

In one embodiment, the charging pile locator 414 can use a trained machine learning model to identify a charging pile that the ADV can reach in the shortest amount of time.

After the charging pile locator 414 selects a charging pile, the ADV can send the location information (e.g., coordinates) of the charging pile to the trajectory generator switch component 415. The trajectory generator switch 415 can send the location information of the charging pile and the current location of the ADV to the open space parking planner 408, which can generate and smooth a trajectory between the ADV and the charging pile.

In one embodiment, prior to generating the trajectory to the charging pile, the ADV may travel along an existing trajectory generated and smoothed by the planning module 305 and the routing module 307. After the trajectory to the charging pile is generated, the ADV can stop following the existing trajectory, and instead start to follow the trajectory to the charging pile. The trajectory to the charging pile can be saved in memory so that the ADV can use the trajectory to get out of the charging station and the open space after the charging is completed.

In one embodiment, after the ADV arrives at the charging pile, the control system 111 can issue driving commands to park the ADV over a charger on the ground at the designated point at the charging pile; and align a magnetic coil in the charger with a magnetic coil fitted to the chassis of the ADV. Once the alignment with a required precision measure is detected, the wireless charging component 417 can operate to perform wireless charging on the ADV. In one implementation, inductive charging technology can be used to enable electricity to be transferred through an air gap from the magnetic coil in the charger to the magnetic coil fitted to the ADV.

In one embodiment, after the battery on the ADV is fully charged or to a predetermined level, the battery sensor 412 can send a message to the parking and charging module 308, which can stop the charging and navigate the ADV out of the charging station and the open space back to an area with lane markers.

In one embodiment, the ADV can use the pre-stored trajectory to get out of the charging station and the open space, or use the open space parking planner 408 to generate another trajectory, depending on a number of factors, including whether the ADV has changed its destination, and whether there is any major change in the road conditions along the pre-stored trajectory.

The open space parking planner 408 may be simply referred to as an open space planner that plans a trajectory in an open space in which the ADV is operating in an open space mode. An open space is referred to a driving area in which there is no lane configuration or map information. The movement of the vehicle is free to move in any direction. The vehicle does not need to follow a lane or traffic rules, etc. A trajectory planned for open space is determined based on the obstacles relative to the current location of the vehicle. Thus, planning module 305 may include an on-lane planner and an open space planner. The planning process may be switched between an on-lane mode or an open space mode, dependent upon whether the driving area includes lane information or supported by the map.

FIG. 5 is a block diagram illustrating an example of an open space parking planner according to one embodiment. The open space parking planner 408 can generate a trajectory for an ADV in an open space, where there is no reference lines or traffic lanes to be followed. Examples of an open space include a parking lot, or a roadway where a vehicle performs a parallel parking, a U-turn, or a three-point turn.

Referring to FIG. 5, in one embodiment, the open space parking planner 408 includes an environment perception module 501, a target function determiner module 503, a constraints determiner module 505, a dual variable warming up module 507, a trajectory generator module 509, and a hybrid A* (A-star) search module 511.

The environment perception module 501, which may be implemented as part of perception module 302, can perceive an environment of the ADV. The target function determiner module 503 can determine a target function for an optimization model (e.g., open space optimization model 521 (as part of models 313 of FIG. 3A)) to optimize. The constraints determiner module 505 can determine constraints for the optimization model. Constraints can include inequality, equality, and bound constraints. The dual variable warming up module 507 can apply a quadratic programming (QP) solver to a target (objective) function to solve for one or more variables (such as dual/two variables) subject to some constraints, where the target function is a quadratic function. The trajectory generator module 509 can generate a trajectory based on the solved variables. The Hybrid A* search module 511 can search for an initial trajectory (zig zag, non-smooth trajectory without consideration for observed obstacles) using a search algorithm, such as an A* search algorithm, or a hybrid A* search algorithm.

A* searching algorithm is an informed search algorithm. Starting from a starting node of a grid having a number of grid cells each representing a node, the A* search aims to find a route or a path to a destination node having the smallest cost (e.g., least distance travelled, shortest time, etc.). Each grid cell or node is associated with a cost based on the relative relationship (e.g., relative distance or position) between the node and the ADV and one or more obstacles within a search area (e.g., region of interest or ROI). The A* searching does this by maintaining a tree of paths originating at the start node and extending those paths one edge at a time until its termination criterion is satisfied. At each iteration of its main loop, the A* search determines which of its paths to extend based on the cost of the path and an estimate of the cost required to extend the path all the way to the goal node. In one embodiment, the A* search selects the path that minimizes the following function as a cost function:

$$f(n)=g(n)+h(n)$$

where n is a next node on the path, g(n) is the cost of the path from the start node to n node, and h(n) is a heuristic function that estimates the cost of the shortest path from n to the goal node. The A* search terminates when the path it chooses to extend is a path from the start node to the goal node or if there are no paths eligible to be extended.

A hybrid A* search algorithm is a variant of the A* search algorithm applied to a 3D (three-dimensional) kinematic state space of the ADV, but with a modified state-update rule that captures continuous-state data in the discrete search nodes of A*. Just as in the A* search algorithm, the search space (x, y, θ) is discretized, but unlike traditional A* which only allows visiting centers of cells, the modified or hybrid-state A* search algorithm associates with each grid cell a continuous 3D state of the vehicle. The modified or hybrid-state A* search algorithm uses the kinematic model of the ADV. For example, three angles including maximum steer left, maximum steer right, and forward may be simulated in the modified or hybrid-state A* search algorithm. For another example, the dimensions (e.g., length, width, or height) of the ADV may be considered in the modified or hybrid-state A* search algorithm. The resulting route or path from the modified or hybrid-state A* search algorithm is to be drivable, rather than being piecewise-linear as in the case of the A* search algorithm.

Figure 6:
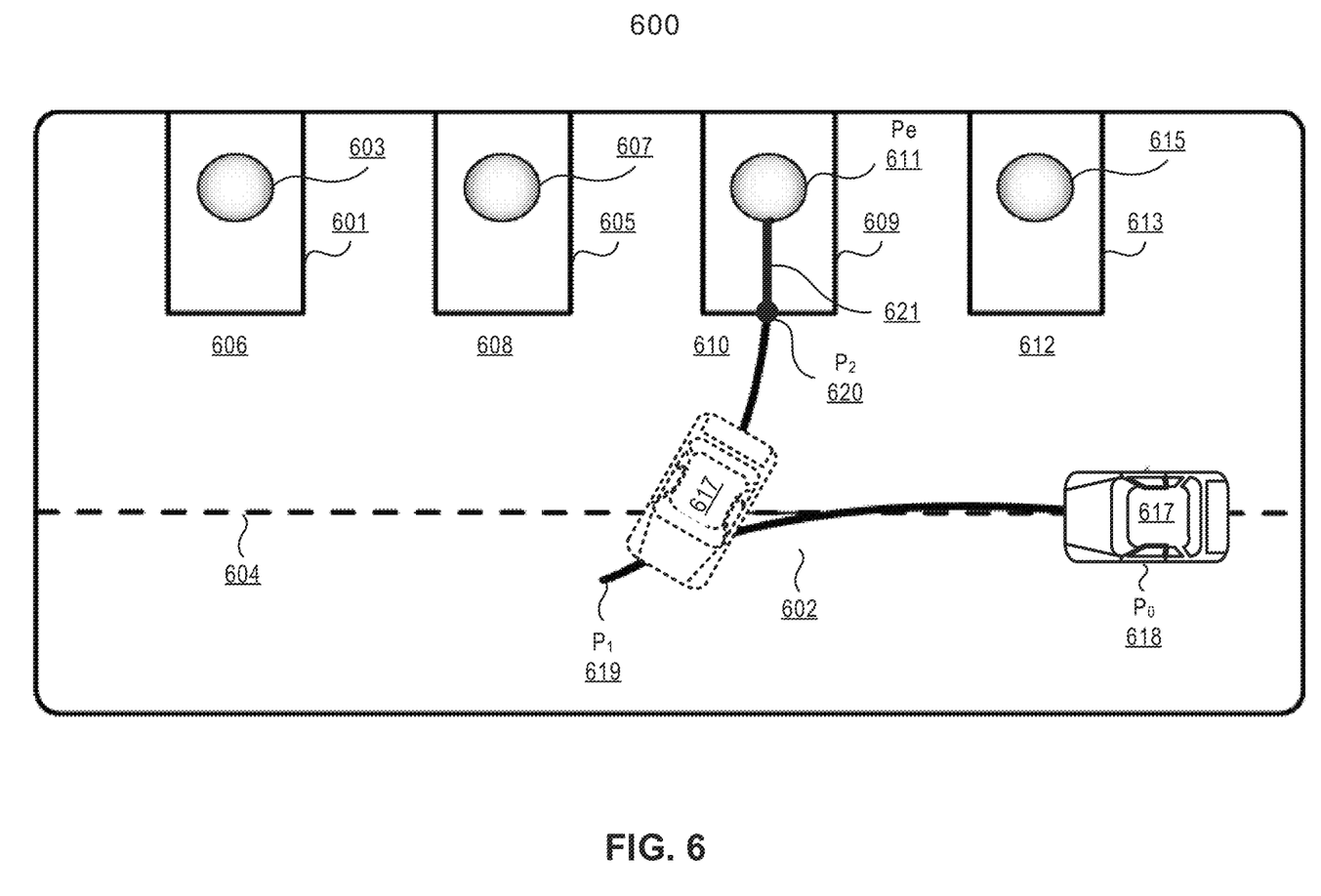
FIG. 6 illustrates an example of a charging station and an example of an open space trajectory according to one embodiment

FIG. 6 illustrates an example of a charging station 600 and an example of an open space trajectory 602 according to one embodiment. As shown in FIG. 6, the charging station 600 can include a number of charging piles 606, 608, 610, and 612. Each charging pile can have a designated point at which an electric ADV must park in order to use the charging pile. Each designed point can be located in a parking space marked by visible parking lines.

For example, the charging pile 606 has a designed point 603 in a parking space 601, the charging pile 608 has a designated point 607 in a parking space 605, the charging pile 610 has a designated point 611 in a parking space 609, and the charging pile 612 has a designated point 615 in a parking space 613.

In one embodiment, each parking space can be an angled parking space, similarly to those typically found in a parking lot. Such angled parking spaces allow a vehicle to park therein without making a sharp turn.

In one embodiment, information about the charging station 600 and each charging pile in the charging station 600 can be stored in a cloud platform. For example, the cloud server can store the location of the charging station, an identifier of each charging pile, the functional status of each charging pile, whether each charging pile is being used for charging an electric vehicle or is idle, the length of time the electric vehicle has been using the charging pile.

In one embodiment, some of the information can be updated in real-time. For example, the information about the charging pile can be updated in real-time to accurately reflect the availability of the charging piles.

An electric or a plugin hybrid autonomous driving vehicle 617 that is travelling along a trajectory 604 can detect that its battery needs to be charged at a location 618. The trajectory 604 can be generated and smoothed by a planning module (e.g., the planning module 305) and a routing module (e.g., the routing module 307).

In response to receiving indication that the battery needs to be charged, the ADV can retrieve information from the cloud server regarding the charging station 600, and identify the charging pile 610 for use in charging the ADV 617. The ADV 617 can subsequently use an open space parking planner (e.g., operating in an open space planning mode using the open space parking planner 408) to park the ADV 617 to the designated point 611 in the parking space 609 of the identified charging pile 610.

In one embodiment, the open space parking planner can divide the parking process into two stages. In the first stage, the open space parking planner can set a temporary destination point $P_2$ 620 and use a Hybrid A* algorithm to generate a trajectory to connect an initial point representing the current location of the ADV 617 to the temporary destination $P_2$ 620.

After the trajectory 602 is generated, the ADV 617 can stop following the trajectory 604, and start to follow the newly generated trajectory 602. When following the trajectory 602, the ADV 617 can drive forward until it comes to the point $P_1$ 619, where the ADV 617 can issue control commands to make a wide turn such that the ADV 617 can drive backward (i.e., drive in reverse) along the segment from the point $P_1$ 619 to the point $P_2$ 620.

When the ADV 617 reaches the temporary destination point $P_2$ 620, the ADV 617 enters the second stage of the parking process. In the second stage, the ADV 617 can generate a trajectory 621 that connects the point $P_2$ 620 and the point Pe 611. The ADV 617 may continue driving backward along the trajectory 621 to the designated point $P_e$ 611.

In one embodiment, the trajectory 621 can be a straight line connecting $P_2$ 620 to $P_e$ 111. The point $P_2$ 620 can be a point at the entrance of the parking space 609. The straight line enables the ADV 617 to park with the desired precision since the ADV 617 can follow a straight trajectory better than following a curved trajectory when driving backward.

In one embodiment, a charger with a magnetic coil can be provided at the designated point 611. When the ADV 617 is parked at the designated point 611, the charger will be located underneath the ADV 617. As a result, the magnetic coil in the charger can be aligned with a magnetic coil in the chassis of the ADV 617. After the ADV 617 detects that the two magnetic coils are aligned with a predetermined precision, the ADV 617 can perform the charging, which would cause electricity to be transferred from the charger to the ADV through an air gap.

Figure 7:
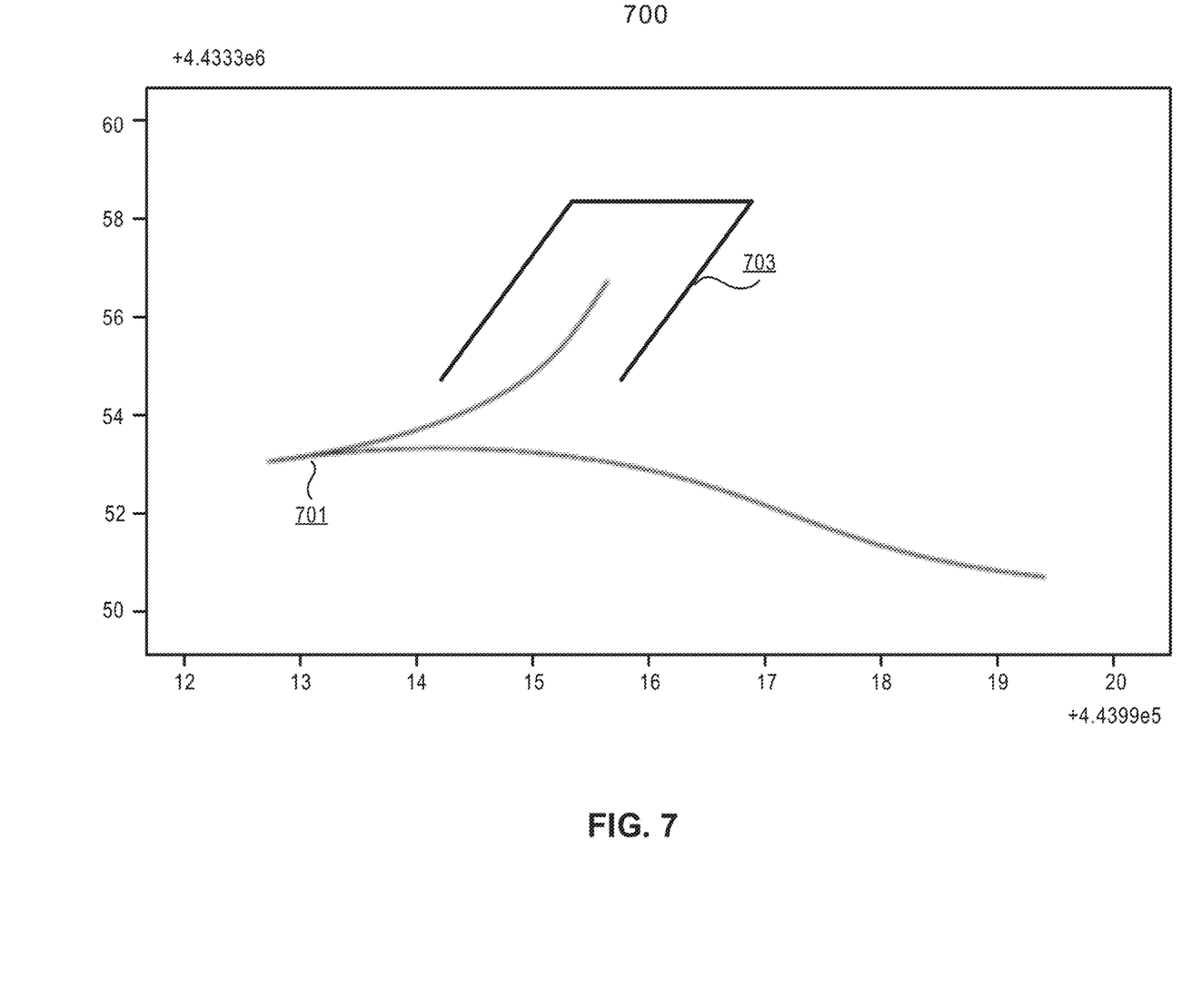
FIG. 7 illustrates an example of a parking space at a charging pile according to one embodiment.

FIG. 7 illustrates an example of a parking space at a charging pile according to one embodiment. As shown in FIG. 7, a parking space 703 can include a charger at a charging pile in an open space 700. A trajectory 701 generated and smoothed by an open space parking planner (e.g., the open space parking planner 408 in FIG. 4) is also shown. The parking space 703 is angled for easy parking. The open space area 700 can be gridded such that the open space parking planner can plan a trajectory that is easier to follow.

In one implementation, the open space 700 include multi-layer grids for implementing a multi-layer grid searching algorithm. A first layer grid including a first set of one or more nodes is defined, where the first layer grid represents an open space in which the target position is located. A second layer grid is defined. The second layer grid includes a second set of one or more nodes corresponding to at least a portion of the first set of one or more nodes. From a start node until a goal node, following operations are iteratively performed. A set of next node candidates are identified by searching in the first set of one or more nodes and the second set of one or more nodes. For each next node candidate of the set of next node candidates, a cost is determined using a cost function. A next node having a lowest cost is selected from the set of next node candidates based on their respective costs. A path trajectory of the ADV is generated based on the start node, the selected nodes and the goal node to control the ADV to position the ADV at the target position autonomously according to the path trajectory.

Figure 8:
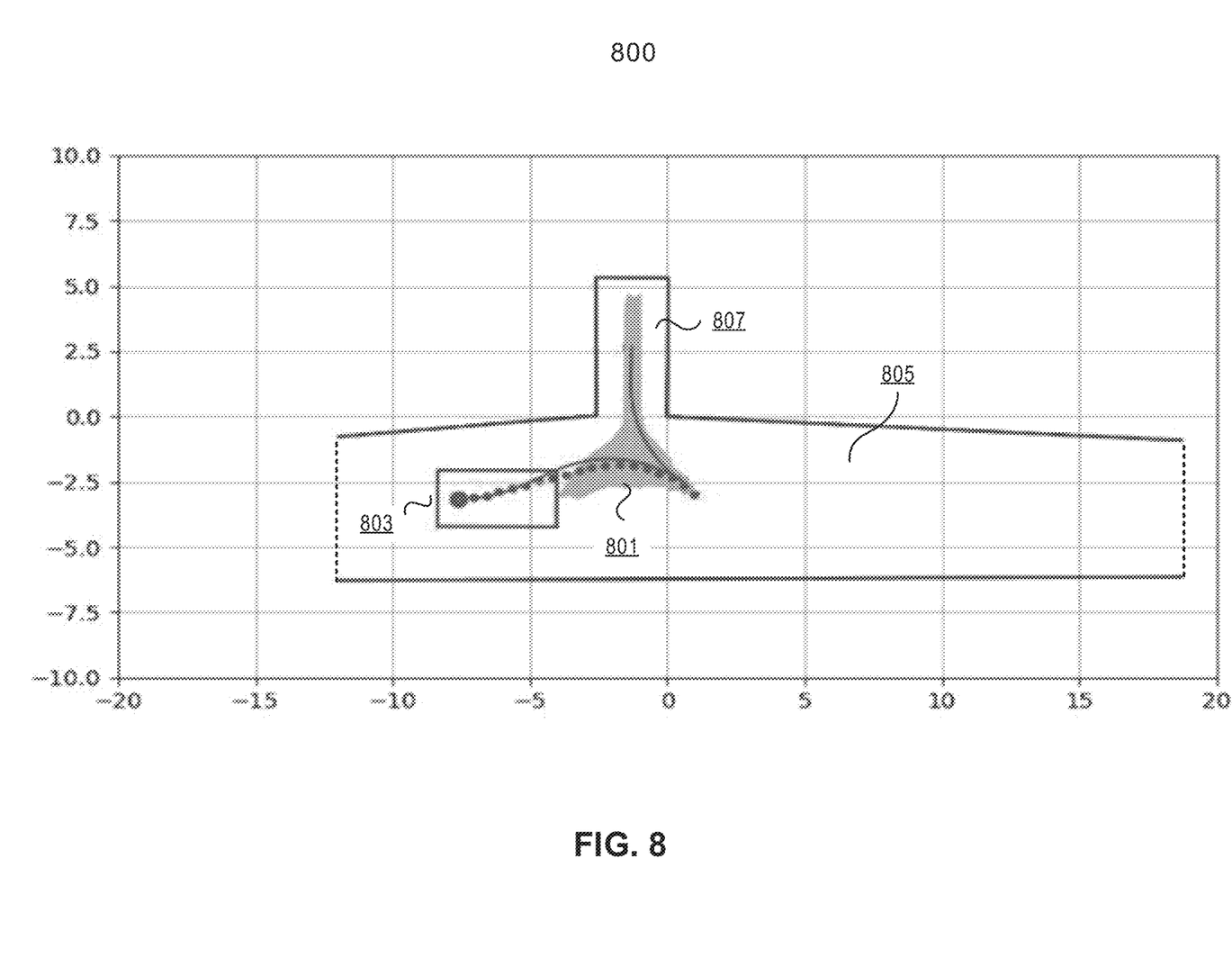
FIG. 8 illustrates an example of a process for searching a trajectory in an open space according to one embodiment.

FIG. 8 illustrates an example of a process for searching a trajectory in an open space according to one embodiment. As shown in FIG. 8, an open space parking planner can search, in a search area 805, for a trajectory from the current location of the ADV to a destination charging pile. The open space parking planner can set the search area 805 with large dimensions, to increase the probability of finding a feasible trajectory in the open space.

In one embodiment, once a feasible trajectory is found, the open space parking planner can stop searching, even if a better trajectory may be located if the whole search area has been searched.

Therefore, in the example search scenario illustrated in FIG. 8, even if the search area 807 is large, the actual search may be limited to the area 801, where a feasible trajectory can be found to allow the ADV to reach a charging pile 807 from the current location 803 without the need to search the whole the search area 805.

Figure 9:
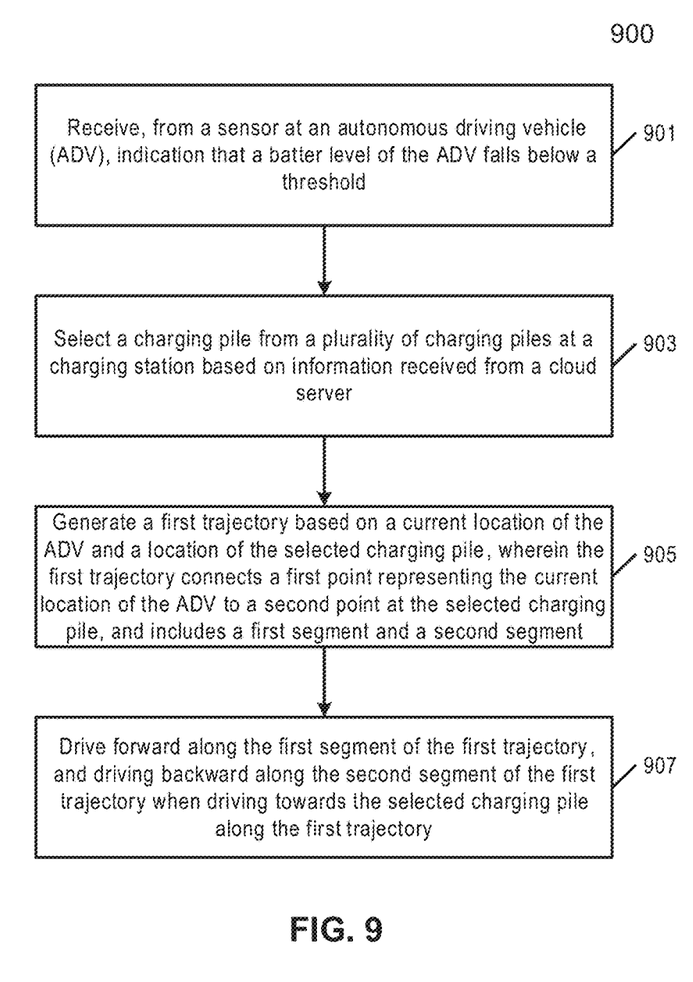
FIG. 9 illustrates an example of a process for parking an ADV for automatic charging according to an embodiment.

FIG. 9 illustrates an example of a process 900 for parking an ADV for automatic charging according to an embodiment. Process 900 may be performed by processing logic which may include software, hardware, or a combination thereof. For example, process 900 may be performed by the parking and charging module 408 as described in FIG. 4.

Referring to FIG. 9, in operation 901, the processing logic receives indication from a sensor on the ADV that a battery level of the ADV falls below a threshold, which can be preset to a percentage of the full battery.

In operation 903, the processing logic retrieves information about the closest charging station from a cloud server, which can include information about a number of charging stations in a particular area and information for each charging pile at each charging station. The processing logic can then select a charging pile for use in charging the ADV based on a number of factors, including the distance between the ADV and the charging pile, the number of static obstacles that the ADV has to get round to reach the charging pile, and the number of required wheel turns to reach the charging pile.

In operation 905, the processing logic can generate a first trajectory based on a current location of the ADV and a location of the charging pile. The first trajectory connects a first point representing the current location of the ADV to a second point at the charging pile. The second point can be a point on an edge of a parking space for the selected charging pile. The first trajectory includes a first segment and a second segment.

In operation 907, the ADV can drive forward along the first segment and drive backward along the second segment when following the first trajectory to the second point at the charging pile for charging.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for autonomously charging autonomous vehicles, comprising:

receiving, from a sensor in an autonomous driving vehicle (ADV), indication that a battery level of the ADV falls below a threshold, wherein the ADV is travelling along a first trajectory generated and smoothed using a first set of applications, wherein the first set of applications are configured to generate and smooth trajectories for the ADV when the ADV travels on a road with visible lane markers;

selecting a charging pile from a plurality of charging piles at a charging station based on information received from a cloud server, wherein the charging pile is located in a parking space, wherein the parking space is rectangular in shape and is marked out with lines on each side;

generating a second trajectory that connects a first point representing a current location of the ADV to a second point in the middle of a side of the parking space, wherein the second trajectory is generated and smoothed using a second set of applications, wherein the second set of applications are configured to generate and smooth trajectories for the ADV when the ADV travels in an open space, wherein the second trajectory includes a first segment and a second segment;

driving forwardly along the first segment of the second trajectory, and driving backwardly along the second segment of the second trajectory when driving towards the charging pile along the second trajectory;

generating a third trajectory connecting the second point to a designated point in the parking space, wherein the third trajectory is a straight line; and driving backwardly along the third trajectory to the designated point for charging.

2. The method of claim 1, wherein charging the ADV includes charging the ADV wirelessly after the ADV is parked at the designated point.

3. The method of claim 1, wherein the cloud server stores information about each of the plurality of charging piles, wherein the information includes one or more of a location of each charging pile, a functional status of the charging pile, or availability of the charging pile.

4. The method of claim 1, wherein generating the second trajectory includes searching for a trajectory that satisfies a set of predetermined constraints in a predetermined search area.

5. The method of claim 1, further comprising:

detecting that the ADV is fully charged or charged to a predetermined level; and automatically driving out of the charging station.

6. The method of claim 1, further comprising:

after the selecting of the charging pile, sending location information of the charging pile and a current location of the ADV to the second set of applications.

7. A non-transitory machine-readable medium having instructions stored therein, which when executed by a processor of an autonomous driving vehicle (ADV), cause the ADV to perform operations, the operations comprising:

receiving indication that a battery level of the ADV falls below a threshold, wherein the ADV is travelling along a first trajectory generated and smoothed using a first set of applications, wherein the first set of applications are configured to generate and smooth trajectories for the ADV when the ADV travels on a road with visible lane markers;

selecting a charging pile from a plurality of charging piles at a charging station based on information received from a cloud server, wherein the charging pile is located in a parking space, wherein the parking space is rectangular in shape and is marked out with lines on each side;

generating a second trajectory that connects a first point representing a current location of the ADV to a second point in the middle of a side of the parking space, wherein the second trajectory is generated and smoothed using a second set of applications, wherein the second set of applications are configured to generate and smooth trajectories for the ADV when the ADV travels in an open space, wherein the second trajectory includes a first segment and a second segment;

driving forwardly along the first segment of the second trajectory, and driving backwardly along the second segment of the second trajectory when driving towards the charging pile along the second trajectory;

generating a third trajectory connecting the second point to a designated point in the parking space, wherein the third trajectory is a straight line; and driving backwardly along the second trajectory to the designated point for charging.

8. The non-transitory machine-readable medium of claim 7, wherein charging the ADV includes charging the ADV wirelessly after the ADV is parked at the designated point.

9. The non-transitory machine-readable medium of claim 7, wherein the cloud server stores information about each of the plurality of charging piles, wherein the information includes one or more of a location of each charging pile, a functional status of the charging pile, or availability of the charging pile.

10. The non-transitory machine-readable medium of claim 7, wherein generating the first trajectory includes searching for a trajectory that satisfies a set of predetermined constraints in a predetermined search area.

11. The non-transitory machine-readable medium of claim 7, wherein the operations further comprise:
   detecting that the ADV is fully charged or charged to a predetermined level; and
   automatically driving out of the charging station.

12. The non-transitory machine-readable medium of claim 7, wherein the operations further comprise:
   after the selecting of the charging pile, sending location information of the charging pile and a current location of the ADV to the second set of applications.

13. A data processing system, comprising:
   a processor; and
   a memory coupled to the processor to store instructions, which when executed by the processor, cause the processor to perform operations, the operations comprising:
      receiving, from a sensor in an autonomous driving vehicle (ADV), indication that a battery level of the ADV falls below a threshold, wherein the ADV is travelling along a first trajectory generated and smoothed using a first set of applications, wherein the first set of applications are configured to generate and smooth trajectories for the ADV when the ADV travels on a road with visible lane markers;
      selecting a charging pile from a plurality of charging piles at a charging station based on information received from a cloud server, wherein the charging pile is located in a parking space, wherein the parking space is rectangular in shape and is marked out with lines on each side;
      generating a second trajectory that connects a first point representing a current location of the ADV to a second point in the middle of a side of the parking space, wherein the second trajectory is generated and smoothed using a second set of applications, wherein the second set of applications are configured to generate and smooth trajectories for the ADV when the ADV travels in an open space, wherein the second trajectory includes a first segment and a second segment;
      driving forwardly along the first segment of the second trajectory, and driving backwardly along the second segment of the second trajectory when driving towards the charging pile along the second trajectory;
      generating a third trajectory connecting the second point to a designated point in the parking space, wherein the third trajectory is a straight line; and
      driving backwardly along the third trajectory to the designated point for charging.

14. The data processing system of claim 13, wherein charging the ADV includes charging the ADV wirelessly after the ADV is parked at the designated point.

15. The data processing system of claim 13, wherein the cloud server stores information about each of the plurality of charging piles, wherein the information includes one or more of a location of each charging pile, a functional status of the charging pile, or availability of the charging pile.

16. The data processing system of claim 13, wherein generating the first trajectory includes searching for a trajectory that satisfies a set of predetermined constraints in a predetermined search area.

17. The data processing system of claim 13, wherein the operations further comprise:
   detecting that the ADV is fully charged or charged to a predetermined level; and
   automatically driving out of the charging station.

18. The data processing system of claim 13, wherein the operations further comprise:
   after the selecting of the charging pile, sending location information of the charging pile and a current location of the ADV to the second set of applications.

* * * * *